United States Patent
Barnes (10) Patent No.: US 7,593,138 B2
(45) Date of Patent: Sep. 22, 2009

(54) SPECIAL EFFECTS ACHIEVED BY SETOVERPRINT/SETOVERPRINTMODE AND MANIPULATING OBJECT OPTIMIZE RENDERING (OOR) TAGS AND COLORS

(75) Inventor: Eric S. Barnes, Manhattan Beach, CA (US)

(73) Assignee: Xerox Corporation, Norwalk, CT (US)

( * ) Notice: Subject to any disclaimer, the term of this patent is extended or adjusted under 35 U.S.C. 154(b) by 599 days.

(21) Appl. No.: 11/224,452

(22) Filed: Sep. 9, 2005

(65) Prior Publication Data

US 2007/0058206 A1 Mar. 15, 2007

(51) Int. Cl.
*H04N 1/40* (2006.01)
(52) U.S. Cl. .............. 358/3.28; 358/1.1; 358/1.18; 283/72; 283/113
(58) Field of Classification Search .......... 358/2.8, 358/1.9, 1.1, 1.18, 3.28; 430/1; 382/100; 283/113, 72
See application file for complete search history.

(56) References Cited

U.S. PATENT DOCUMENTS

| | | | | |
|---|---|---|---|---|
| 5,678,863 A * | 10/1997 | Knight et al. | ............... | 283/113 |
| 5,687,303 A * | 11/1997 | Motamed et al. | ........... | 358/1.18 |
| 6,809,839 B1 * | 10/2004 | Earl et al. | .................... | 358/1.9 |
| 2003/0124436 A1* | 7/2003 | Shioda et al. | .................. | 430/1 |
| 2003/0160985 A1* | 8/2003 | Bailey | ........................ | 358/1.9 |
| 2004/0101158 A1* | 5/2004 | Butler | ........................ | 382/100 |
| 2004/0120593 A1* | 6/2004 | Earl et al. | ................... | 382/245 |

* cited by examiner

*Primary Examiner*—Thomas D Lee
(74) *Attorney, Agent, or Firm*—Luis M. Ortiz; Kermit D. Lopez; Ortiz & Lopez, PLLC (57) ABSTRACT

Adobe Postscript's setoverprint and setoverprintmode operations, an imager and Object Optimized Rendering (OCR) technology can be combined to achieve a watermark result by either tagging lower image areas as text or other intents, or by changing color values. Separations from stacked objects are combinable with control over OOR tags and color values to achieve special effects are described. Mechanisms of the present embodiment would provide the option where special areas can either disappear and retain the lower object attributes or modify lower object runs with special effect algorithms.

19 Claims, 9 Drawing Sheets

SPECIAL EFFECTS ACHIEVED BY SETOVERPRINT/SETOVERPRINTMODE AND MANIPULATING OBJECT OPTIMIZE RENDERING (OOR) TAGS AND COLORS

TECHNICAL FIELD

The present embodiment is generally related to the rendering of special effects in documents, such as watermarks and glossmarks. More particularly, the present embodiment is related to the use of setoverprint/setoverprintmode functions, object optimize rendering and/or color manipulation to achieve special effects in documents rendered within most printing systems.

BACKGROUND

Special printed effects such as watermarks and glossmarks are desired options by users of printing systems. Digital watermarks serve the purposes of identifying quality and assuring authenticity. A digital watermark is generally invisible to the naked eye. It can be hid in naturally occurring variations throughout an image. Watermarks are designs or patterns placed onto printed document during its physical rendering. Watermarks are created by making thinner (line or wire watermarks) or thicker (shadow watermarks) on the layer of pulp when it is still wet.

Like watermarks, glossmarks can embed a unique image in a document to, for example, discourage counterfeiting. Information embedded in a glossmark print—for example, a seal or a date and time—catches the light when it is tilted and can be seen as an additional and separate image. But the embedded information cannot be reproduced on a conventional copier or scanner. Glossmark technology has two advantages over holograms and other laminates that are used to create similar effects on documents: the glossmark process does not require any additional printing steps or incremental costs, and it accommodates variable information, like a name, a timestamp or a code. Because a differential gloss pattern that creates the glossmark cannot be reproduced in a second generation copy, the pattern is secure. It can be used to put authenticating marks on high-value items, like tickets, and on ID cards and other valuable documents.

Object optimized rendering (OOR) includes methods for creating, decomposing and outputting a page image including run tags to a print engine which allows for the printing characteristics of individual objects tags and colors to be optimized, as in the hand-composing graphic arts field, while simultaneously retaining the benefits and efficiencies available when creating a page image using a microcomputer. Such page images are created using Page Description Languages (PDLs).

There are many PDLs in use today. Two of the most dominant languages are PostScript and PDF from Adobe Corporation. All PDLs provide a mechanism for dealing with the properties of the printer device they manage. This includes management of paper size, duplexing, document finishing options and so on. In implementations this is usually controlled via a device specific language extension. Modern PDLs allow the downloading of fonts, International Color Consortium (ICC) profiles, and so on.

Most methods for achieving special effects such as glossmarks and watermarks are complicated. What are needed are simplified methods for creating such effects.

SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is a feature of the embodiments to provide methods that enable the production of special effects such as watermarks and glossmarks onto printed documents with ease.

In accordance with the present embodiment, special effects such as watermarking orthographic area and sampled images, and glossmarks, are achieved when Postscript setoverprint/setoverprintmode operators and object optimize rendering (OOR) are used together.

A method in accordance with the embodiment is carried out in a printing system to create special effects including glossmarks and watermarks for use in rendered documents by using an interpreter to determine parameters for a special effect, overlaying the object parameters for the special effect over original objects of a document, flattening object parameters for the special effect and original objects of a document by addressing topmost objects first to produce runs with intent tags, introducing intents or altered colors for use with special effects, collecting runs and rendering runs with intent tags.

A method in accordance with the embodiment is carried out in a printing system using Adobe Postscript operators to create special effects including glossmarks and watermarks in rendered documents. The method uses an interpreter to determine parameters for a special effect, overlays object parameters for the special effect over original objects of a document, determines whether topmost objects have all opaque separations and carrying out at least one of extracting and tagging runs with intent tags appropriate to the object type from the topmost object if it is determined whether the topmost object have opaque separations or creating runs extracting color information from top and bottom objects and attaching at least one programmable intent tag that can produce special effects, collects runs, and renders runs with intent tags.

In accordance with the embodiment, a printing system adapted for achieving special effects on a rendered document is provided that includes a software module providing functions of at least one of Adobe Postscript setoverprint and setoverprintmode operations; object optimized rendering (OOR); and a color imager. Separations from stacked objects are combined in the system with control over at least one of OOR tags and color values to achieve special effects on a rendered document.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Under normal conditions, to achieve a special effect (e.g., watermark), only boundary pixels outlining text used for a watermark would be rendered over contents of a printed document. Also, watermarked text may not be rendered under normal imaging and printing. Adobe Postscript's setoverprint and setoverprintmode operations, an imager and Object Optimized Rendering (OOR) technology can be combined to achieve a watermark result by either tagging sampled image areas as text or other intents, or by changing color values.

Adobe System Incorporated's definition for aspects of its Overprint Mode is as follows:

Bool setoverprintmode—
sets the overprint mode parameter in the graphics state to bool. This parameter has no effect when overprint is false.

The overprint mode affects the interpretation of a tint value of 0.0 for a color component in the DeviceCMYK color space when rendered on a native DeviceCMYK device. When overprintmode is false and the overprint parameter is true, overprint has the same behavior as described in PostScript Language Reference, Third Edition for setoverprint When overprint is true, each source color component value replaces the value previously painted for the corresponding device colorant, no matter what the new value is.

When overprintmode and overprint are both true, a tint value of 0.0 for a source color component leaves the corresponding component of the previously painted color unchanged. This behavior is called "nonzero overprint."

In accordance with the preferred embodiment a method is described wherein separations from stacked objects are combined with control over OOR tags and color values to achieve special effects is described. Mechanisms of the present embodiment would provide the option where specified areas can either retain their OOR tags or can force a programmed set of OOR tags producing a watermark/GlossMark result.

Figure 1:
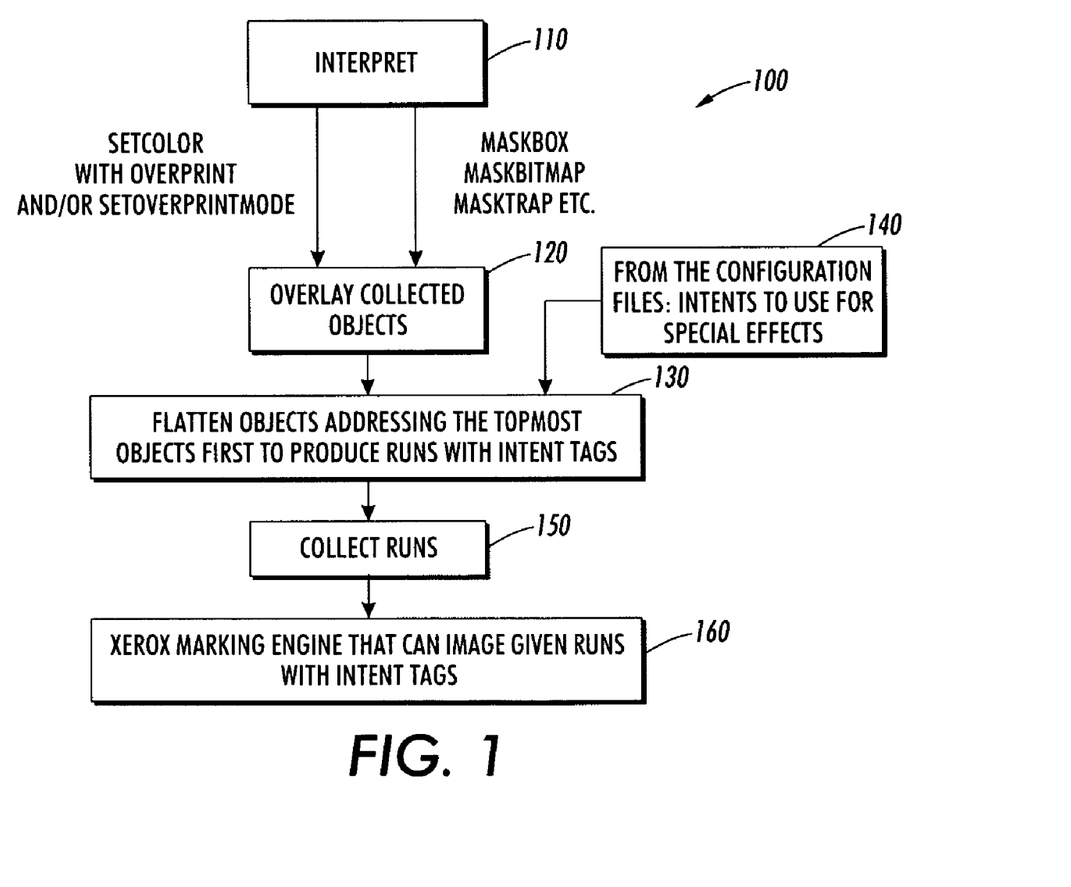
FIG. 1 illustrates a flow diagram of steps that can be executed in accordance with the embodiment within a printing system to apply a watermark, glossmark or other custom intent tag for objects collected with setoverprint or setoverprintmode functions.

Referring to the flow diagram 100 in FIG. 1, the flow diagram illustrates steps that can be executed within a printing system to apply a watermark, glossmark or other custom intent tag for objects collected with setoverprint or setoverprintmode functions. As shown in step 110, an Interpreter is used to determine object parameters, such as SetColor and Mask, for a special effect that is selected for rendering on a document. All Mask operations are preceded by a SetColor. Special effect Mask operations are also preceded by a setoverprint and/or setoverprintmode operator. Mask parameters include MaskBox, MaskBitmap and MaskTrap. Object parameters for the special effect are overlaid onto a document as shown in step 120. As shown in step 130, flattening of objects occur beginning with objects addressing the topmost objects, producing runs with intent tags. As shown in step 140, intents for use with special effects are introduced. As shown in step 150, runs with intent tags are rendered by the printing system.

Objects stacked preceded by the Postscript PDL setoverprint and setoverprintmode operators, and code within the Xerox CImager can create OOR tags to achieve special effects. The tags and algorithm to change color values that the Cimager will use for the overprint areas can be programmable via a printing system's configuration parameters and GUI controls.

A special effect watermark can be achieved by placing text over a photograph image and having (1) the text color DeviceCMYK tint values of C=0.0, M=0.0, Y=0.0 and K=0.0, and (2) the SetColor and text placement preceded by the Postscript operators setoverprint and setoverprintmode. The strict definition of setoverprintmode prescribes that the result of setoverprintmode "leaves the corresponding component of the previously painted color unchanged" and the text on top of image would visibly disappear. In accordance with an aspect of the embodiment, OOR tags and/or color values for these areas can be modified and become visible when normal imaging would have these areas disappear completely since these areas can be detected during object flattening.

A simple example of how to place special effect text "XEROX" is as follows:

%!PS-Adobe-2.0 EPSF-2.)
%%Creator: XEROX
%%Title: box_with_watermark.ps
%%Pages: 1
%%BoundingBox: 27 215 574 586
%%EndComments
%%EndProlog
%%Page 1 1
%%%%%%% Image a solid color box %%%%%%%
1 0 0 setrgbcolor -continued

```
      e0d0e0e0d0e0e0d0e0e0d0e0e0d0...
      ...
      %%% the image pixels %%%
      ...
      504040706060a09090a0a0a0909090809080a0a080809070909080
      9080800000000000000000000000000000000000000000000000000
      00000000000000000000000000
   grestore
   /inch {72 mul} def
   /F{%def
      findfont exch scalefont setfont
      } bind def
   100 /Helvetica F
   %%%%%%% Set Postscript's overprint operator %%%%%%%
   true setoverprint
   %%%%%%% Set a DeviceCMYK color representing only C and Y
   %%%%%%%
   [/DeviceN [ (Cyan) (Yellow) ] /DeviceCMYK { 0 1 0 } ] setcolorspace
   .5 .25 setcolor
   %%%%%%% Place some watermark text string %%%%%%%
   80 250 moveto
   (XEROX) show
showpage
%%Trailer
```

The result of the above PDL will have the cyan and yellow separations of the "XEROX WATERMARK" text combined with the magenta and black separations of the sampled image. Where the object separations are combined can be recognized by the Xerox imager and the resulting OOR intent tags for the product can be set automatically by assessing the objects making up the result or forced to be a value via the system's configuration parameters or GUI controls to achieve a special effect.

In addition to changing OOR tags, this ID mechanism allows color values to be modified in the areas. This would be useful when simply changing the OOR tag cannot achieve the desired watermark or the change resulting from the new OOR tags is not sufficient. The same PDL code is used but in addition to the OOR tag setting, or independent of the OOR setting, a color changing algorithm is selected and activated via the system's configuration settings. An example of this might be a XEROX hidden watermark added to a solid cyan box area. The special effects achieved by changing the OOR tags in the "clear" nonzero overprint area might not create enough of a visible change from the surrounding areas. A simple algorithm that changes the cyan color value—possibly adjusting all cyan color values to be between minimum and maximum programmed values, or changing the cyan and/or M, Y and K values dramatically can be applied to achieve a subtle or dramatic watermark. This method can also create a special effect watermark over white areas of the page where no objects with color were placed if setoverprint "clear" objects are placed in those areas. White areas that normally would have no toner would now have a minimum level of cyan color in the areas of the setoverprint "clear" objects.

Figure 2:
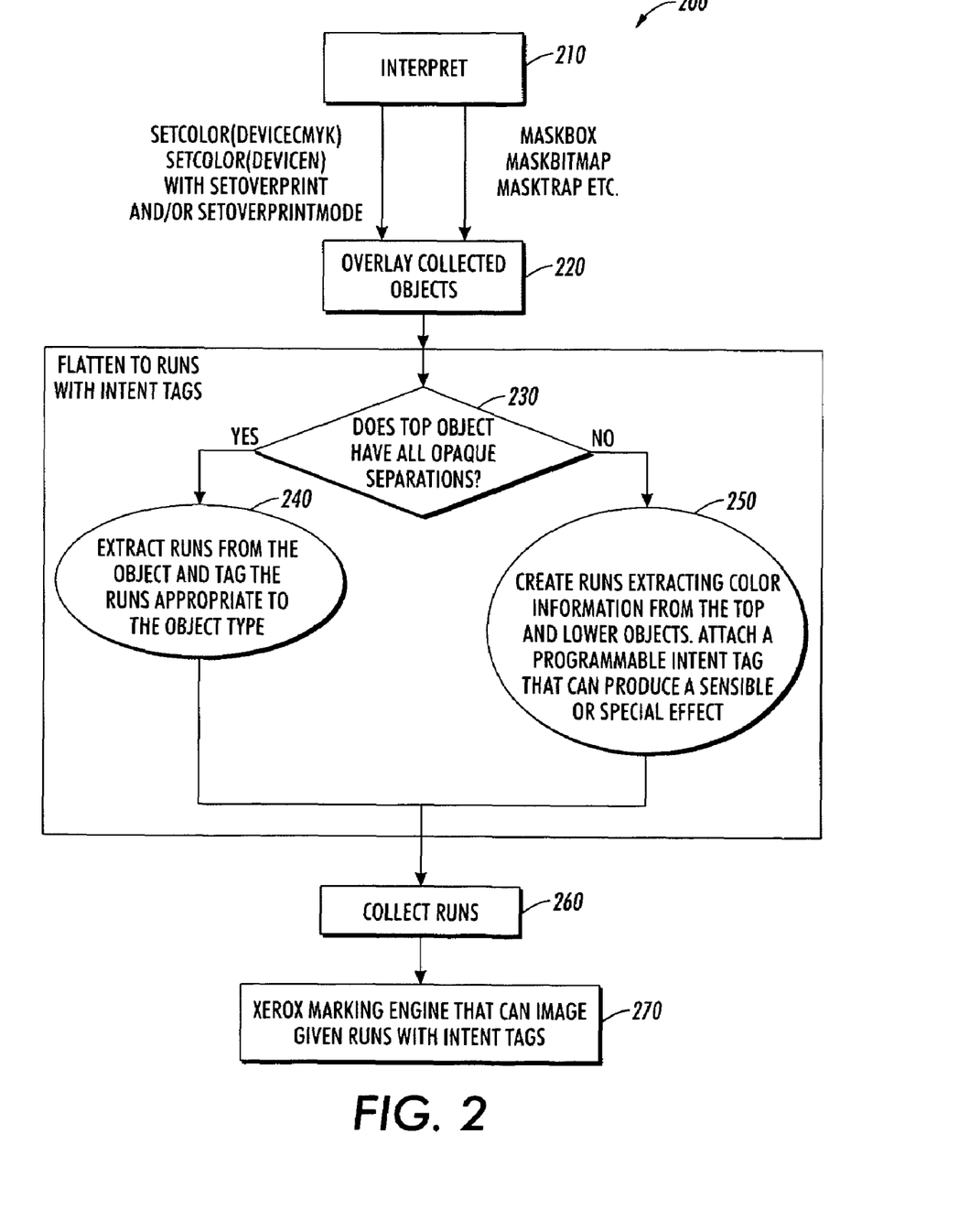
FIG. 2 illustrates a flow diagram of steps that can be executed in accordance with the embodiment for applying a watermark, glossmark or other custom intent tag to a document for object collected with Adobe Postscript operators, e.g., setoverprint and setoverprintmode.

In accordance with the embodiment, alternative method steps for applying a watermark, glossmark or other custom intent tag to a document for object collected with Adobe Postscript operators, e.g., setoverprint and setoverprintmode, set as shown in the flow diagram 200 of FIG. 2. As shown in step 210, an interpreter is used to determine parameters for the special effect. Parameters can include SetColor (e.g., DeviceCYMK) or SetColor (DeviceN) with setoverprint and/ or setoverprintmode set. Parameters can also include Mask-Box, MakBitmap, MaskTrap, etc. As shown in step 220, object parameters for the special effect are overlaid over original objects of a document. As shown in step 230, it is -continued

```
      25 200 moveto
      0 400 rlineto
      550 0 rlineto
      0 -400 rlineto
      closepath
      fill
   /inch {72 mul} def
   /F{%def
      findfont exch scalefont setfont
      } bind def
   100 /Helvetica F
   %%%%%%% Set Postscript's overprint and overprintmode operators
   %%%%%%%
   true setoverprint
   true setoverprintmode
   %%%%%%% Set a DeviceCMYK color of 0, 0, 0, 0 %%%%%%%
      0 0 0 0 setcmykcolor
   %%%%%%% Place some watermark text string on top of the box
   %%%%%%%
   80 250 moveto
   (XEROX) show
showpage
%%Trailer
```

Figure 6:
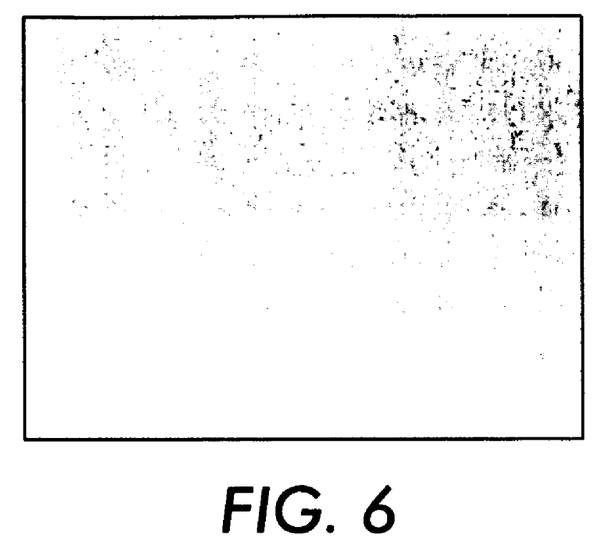
FIG. 6 illustrates an example where setoverprintmode "clear" is used to apply the text "XEROX" on a document.
Figure 7:
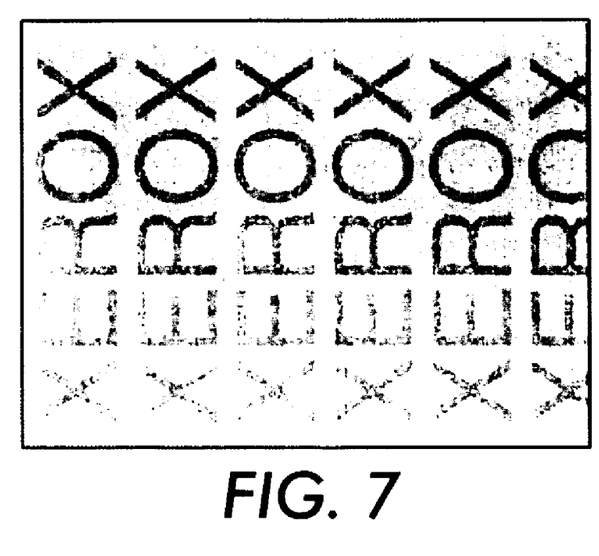
FIG. 7 illustrates an example wherein the same text ("XEROX") is shown as a special effect on the document where setoverprintmode "clear" text is applied.

By Adobe's strict definition of Overprint Mode and "non-zero overprint", the text of the "(XEROX) show" PDL should disappear showing only the previously placed and lower graphics object. With the Xerox's imager and DocuSP controls, the "XEROX" text can change the intent tags in the text area and result in a special rendering result as shown in FIG. 6. As an example, this modified rendering intent could be used to pass colors through a different color transformation or be forced to a new color. Another example might have the region of the image below the overprint text/orthographics objects half toned differently resulting in a differential gloss relative to the rest of the image (GlossMarks). In the GlossMarks example, runs or pixels with this modified rendering intent could be passed through a software half toning algorithm to produce an optimum gloss difference relative to the system halftone.

This present embodiment is not limited to application only in the "clear text" or "clear orthographics" example. It can be applied to all combinations of setoverprint-DeviceN and set-overprint-setoverprintmode combinations where one, two, three, or all separations are "clear." These areas can be detected by the object flattener and have the rendering intent tags modified as desired.

An example of code using DeviceN color space that can drive the special effects is shown in italics below:

```
%!PS-Adobe-2.0 EPSF-2.)
%%Creator: XEROX
%%Title: noname.ps
%%Pages: 1
%%BoundingBox: 27 215 574 586
%%EndComments
%%EndProlog
%%Page 1 1
   %%%%%%% Image a sampled image %%%%%%%
   /picstr 384 string def
   27 215 translate
   1 1 scale
   547 371 scale
   570 386 8
   [ 570 0 0 -386 0 386 ]
   { currentfile picstr readhexstring pop }
   false 3
   colorimage
      e0e0d0e0e0d0e0e0d0e0e0d0e0e0d0e0e0d0e0e0d0e0e0d0e0
``` determined whether the topmost objects have all opaque separations. If it is determined that topmost objects have all opaque separations, runs with intent tags appropriate to the object type are extracted and tagged from the topmost object as shown in step 240; but runs are created by extracting color information from top and lower objects and attaching at least one programmable intent tag that can produce special effects if it is determined that topmost objects do not have all opaque separations, as shown in step 250. The runs are then collected as shown in step 260 and rendered with intent tags as shown in step 270.

Figure 3:
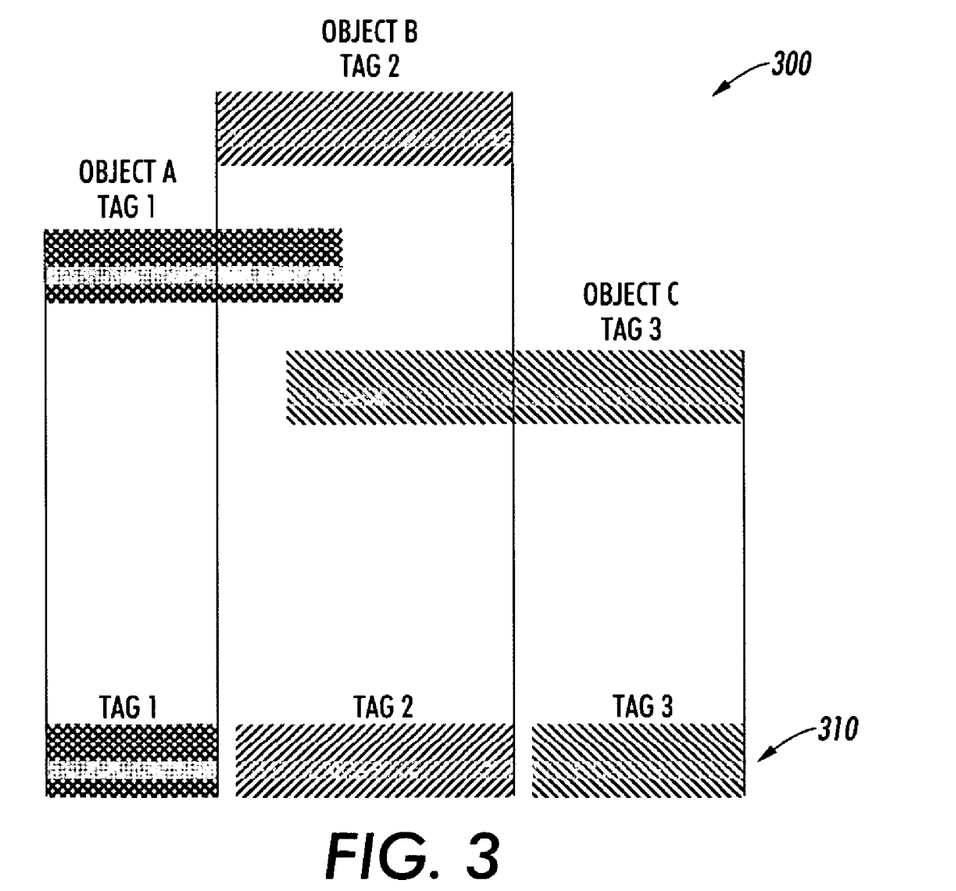
FIG. 3 illustrates a graph of an example showing normal flattening of collected objects A-C that have all separations opaque have their runs and all separate colors collected when they are the top object.

Referring to FIG. 3, a graph 300 illustrates an example showing normal flattening of collected objects A-C that have all separations opaque have their runs and all separate colors collected when they are the top object. The intent tags 1-3 corresponding to the run segments are from the top object type. The resulting collected runs are indicated 310 near the bottom portion of the graph.

Figure 4:
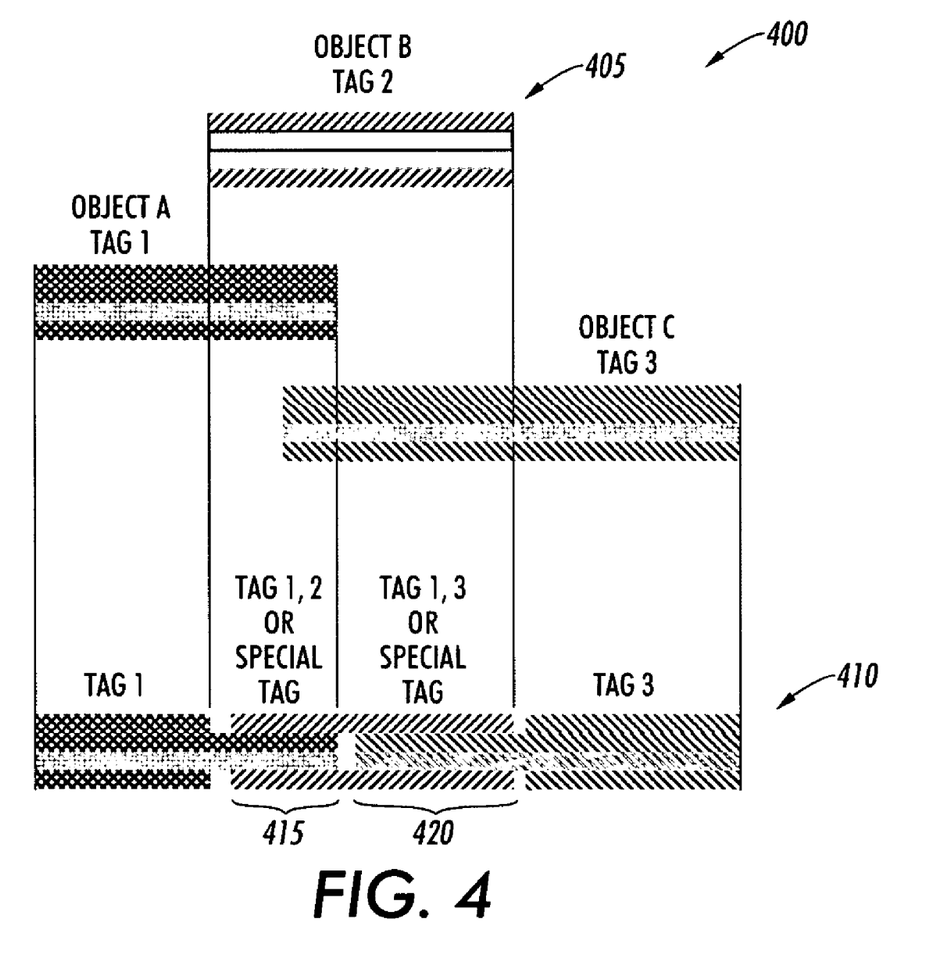
FIG. 4 illustrates a graphical example showing that a top object B collected with a Device N color parameter contributes only a subset of the separation colors with the lower objects A and C supplying the remaining separate colors.

Referring to FIG. 4, a graph 400 illustrates an example showing that a top object B collected with a Device N color parameter contributes only a subset of the separation colors with the lower objects A and C supplying the remaining separate colors. The tags 1-3 associated with the hybrid run can be calculated given the make-up by a combination of run types, or forced to a specific intent tag type if a color merge was performed. Arrow 405 in the example show the top object B with only C and K (of CYMK) opaque, while M and Y are clear and will be combined with separation values from objects A and C. Features of Object B and A are discernable as shown with arrow 415, the resulting tag is programmable and can produce a "visually best" printed result or a special effect. Features from Objects B and C are also discernable as shown by arrow 420, the resulting tag being programmable and capable of producing a "visually" best printed result or a special effect. The resulting run 410 is again indicated near the bottom portion of the graph.

Figure 5:
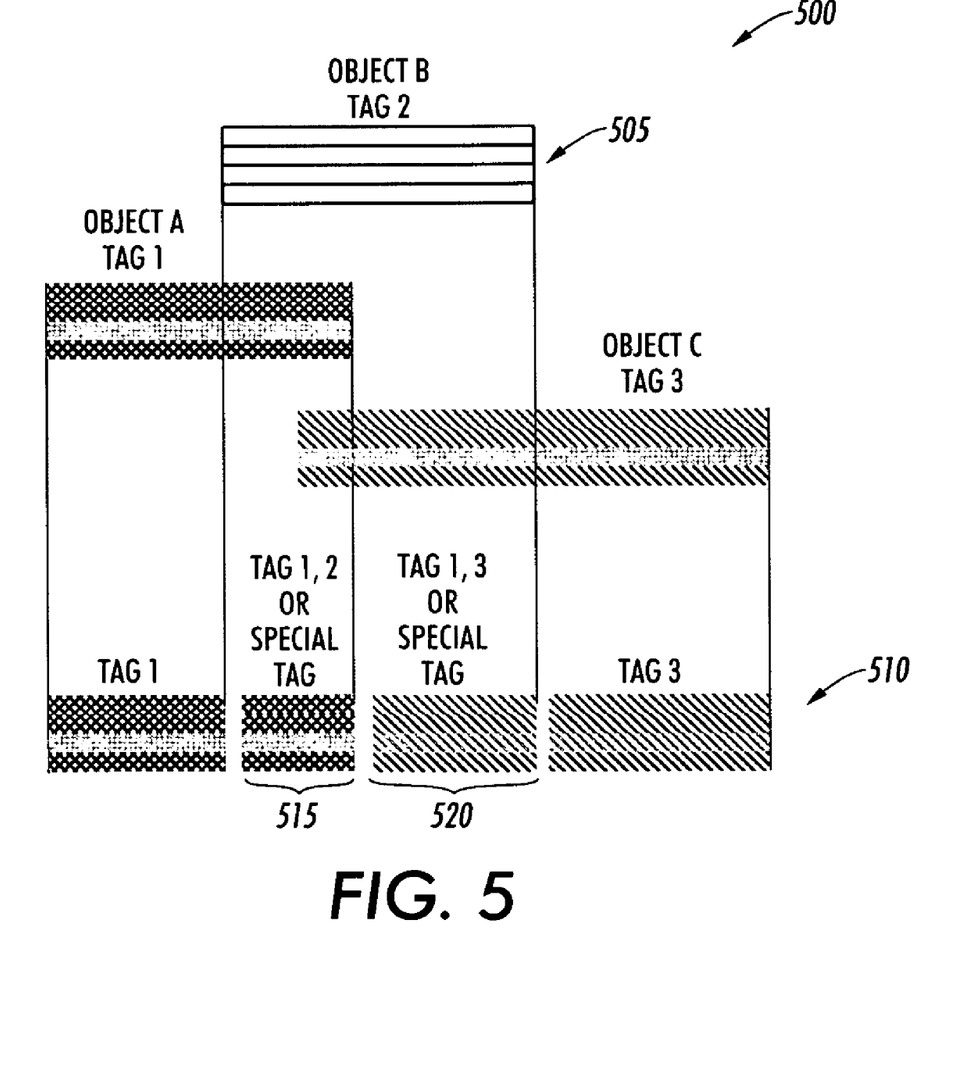
FIG. 5 illustrates a graphical example wherein a special case occurs when "clear" objects B (e.g., image, graphics or text) are placed over other object types A and C.

Referring to FIG. 5, a graph 500 illustrates an example wherein a special case can occur when "clear" objects B (e.g., image, graphics or text) are placed over other object types A and C. Clear objects are objects collected with setoverprint, setoverprintmode and a DeviceCYMK color with all separations having tint values of 0.0, which is shown by arrow 505. The Postscript "nonzero overprint" objects should disappear, however, with this embodiment the flattened run color values are all from the lower objects, but the tags 1-3 associated with the runs can be programmable. In addition, with this embodiment, the lower run colors can be modified given any system configured algorithm. Features from Object A are discernable as shown with arrow 515, the resulting tag is programmable and can produce a special effect. Features from Objects C are also discernable as shown by arrow 520, the resulting tag being programmable and capable of producing a special effect. The resulting run 510 is indicated near the bottom portion of the graph. The printed result, having these areas half toned or line screened different from their surrounding areas, or colors modified, can achieve a watermark or glossmark effect on/in a document.

Examples of work product in accordance with using the methods described herein are shown in FIGS. 6-11.

Referring to FIG. 6, provided is an example where setoverprintmode "clear" is used to apply the text "XEROX." Standard OOR tags (special effects not enabled) are applied and no color is defined in any separation in the PDL. The text disappears in the rendered document using these parameters. Now referring to FIG. 7, the same text ("XEROX") is shown as a special effect on the document where setoverprintmode "clear" text is applied to the document and includes a custom programmable OOR tag.

Figure 8:
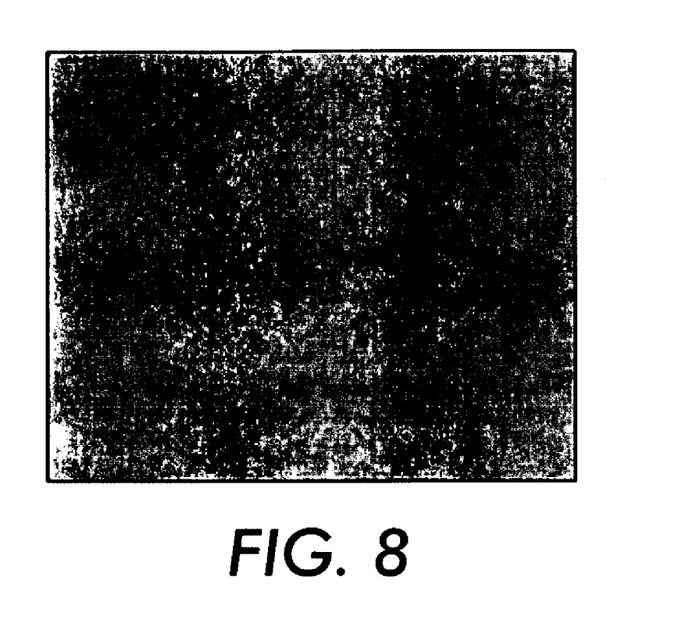
FIG. 8 illustrates an example wherein setoverprintmode "clear" is again used to apply the text "XEROX."
Figure 9:
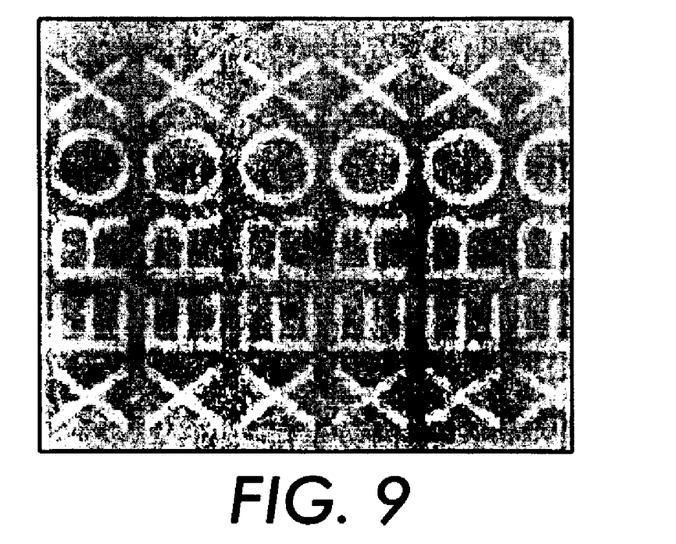
FIG. 9 illustrates "XEROX" as a special effect on the document where setoverprintmode "clear" text is applied to the document and includes a color adjustment rather than modifications to the OOR tags.

Referring to FIG. 8, provided is an example where setoverprintmode "clear" is again used to apply the text "XEROX." Standard OOR tags (special effects not enabled) are applied and no color is defined in any separation in the PDL. The text disappears in the rendered document using these parameters. Now referring to FIG. 9, the same text ("XEROX") is shown as a special effect on the document where setoverprintmode "clear" text is applied to the document and includes a color adjustment rather than, on in addition to, modifications to the OOR tags.

Figure 10:
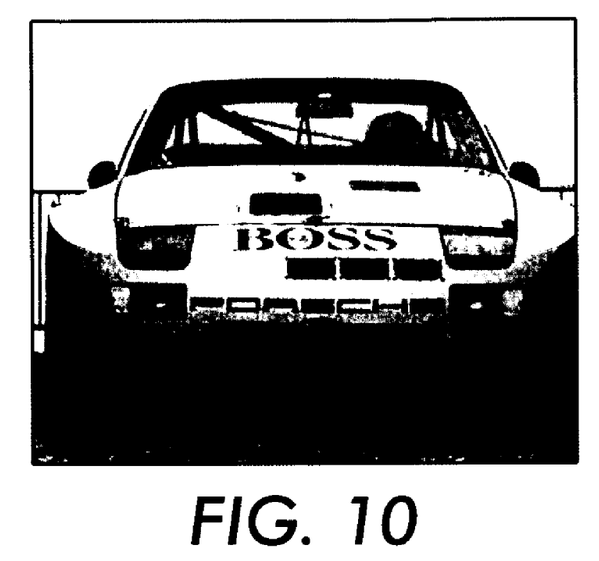
FIG. 10 illustrates a photograph of a sports car wherein setoverprintmode "clear" text standard OOR tags are applied.
Figure 11:
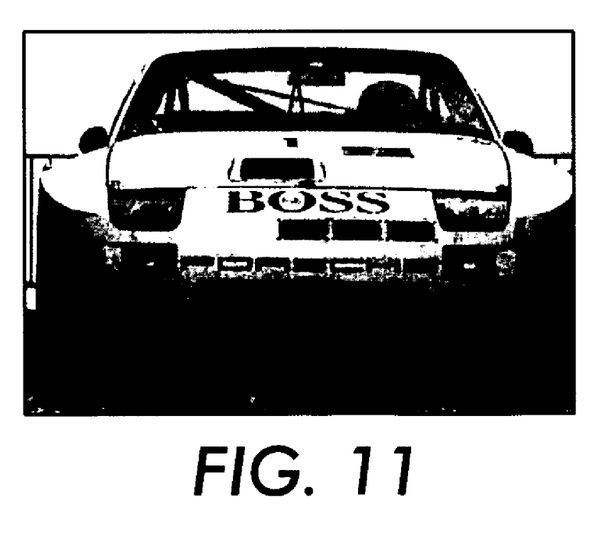
FIG. 11 illustrates an example where setoverprintmode "clear" text with a custom programmable tag applied results in the printing of the text "XEROX" on/in the image of the car.

Referring to FIG. 10, a photograph of a sports car is provided showing an example where setoverprintmode "clear" text standard OOR tags applied. As with FIG. 6 and FIG. 8, the clear text disappears in the rendered photograph. FIG. 11, however, shows an example where setoverprintmode "clear" text with a custom programmable tag applied results in the printing of the text "XEROX" on/in the image of the car. Adjustments were made to the OOR tags and resulting halftone in these areas.

Figure 12:
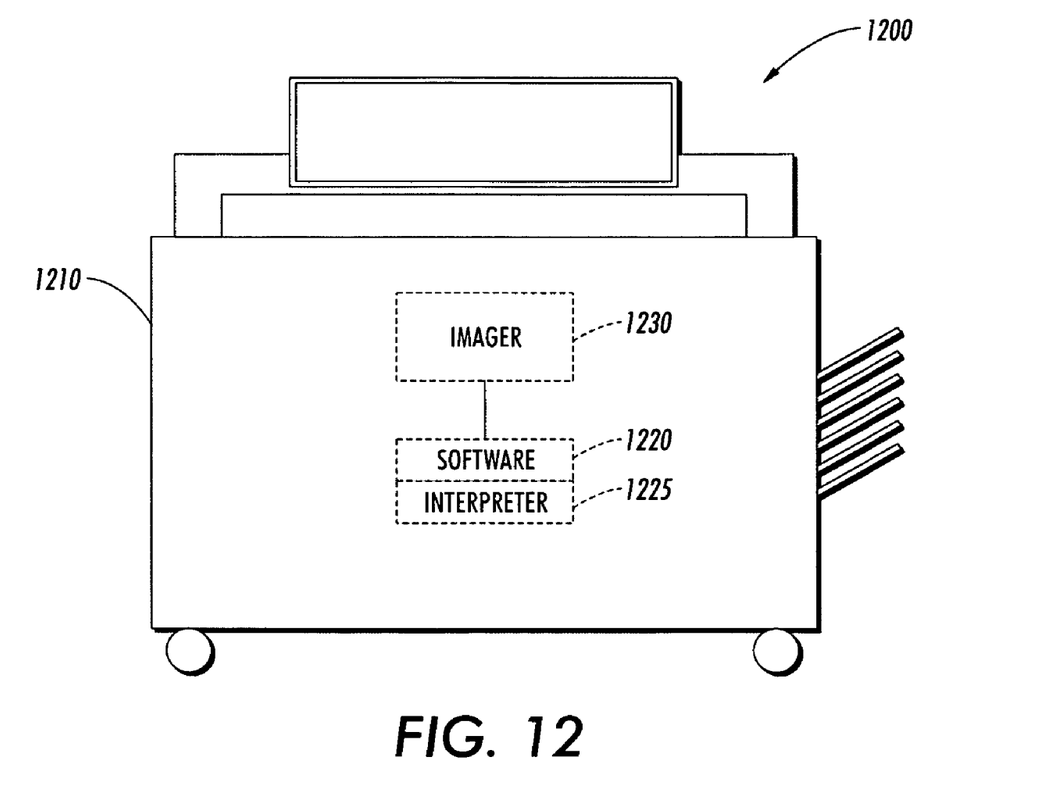
FIG. 12 illustrates a system architecture for carrying out methods in accordance with the embodiment.

A system required to carry out the embodiment is simple. Referring to FIG. 12, a system architecture 1200 is illustrated. The system includes a printer 1210 adapted for achieving special effects on a rendered document that includes a software modules 1220 providing functions of at least one of Adobe Postscript setoverprint and setoverprintmode operations, and object optimized rendering (OOR), and a color imager1230. The printing system 1210 is adapted with the software 1220 and imager 1230 to process separations from stacked objects such that they are combined with control over at least one of OOR tags and color values to achieve special effects on a rendered document. The software modules include 1220 an interpreter 1225 to determine parameters for a special effect. The software modules 1220 can be adapted to overlay object parameters for the special effect over original objects of a document. The software modules 1220 can be adapted to flatten object parameters for the special effect and original objects of a document by addressing the topmost objects first to produce runs with intent tags. The software modules 1220 can be adapted to introduce intents for use with special effects. The software modules 1220 can be adapted to collate runs. The software module is adaptable to render runs with intent tags. The software modules 1220 can be adapted to determine and execute parameters for a special effect including parameters selected from at least one of: MaskBox, MaskBitmap, MaskTrap and SetColor.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. Method carried out in a printing system for creating special effects including glossmarks and watermarks for use in rendered documents, comprising the steps of:
   a) using an interpreter to determine parameters for a special effect;
   b) overlaying the object parameters for the special effect over original objects of a document;
   c) flattening object parameters for the special effect and original objects of a document by addressing topmost objects first to produce runs with intent tags;

d) introducing intents or altered colors for use with special effects;
e) collecting runs; and
f) rendering runs with intent tags.

2. The method of claim 1, wherein parameters for a special effect include at least one of MaskBox, MaskBitmap, MaskTrap, SetColor, and setoverprint and/or setoverprintmode.

3. The method of claim 2, wherein SetColor and Mask operations are preceded by setoverprint and/or setoverprintmode.

4. The method of claim 2, wherein Mask parameters are programmable via server configurations associated with the printing system.

5. The method of claim 4, wherein object optimized rendering (OOR) tags are used to produce the special effect.

6. The method of claim 2, wherein object optimized rendering (OOR) tags are used to produce the special effect.

7. The method of claim 1, wherein at least one Adobe Postscript setoverprint and setoverprintmode operator is used to produce the special effect.

8. The method of claim 1, wherein object optimized rendering (OOR) is used to produce the special effect.

9. The method of claim 1, wherein an altered color value is used to produce the special effect.

10. Method using Adobe Postscript operators to create special effects including glossmarks and watermarks in rendered documents, comprising the steps of:
    a) using an interpreter to determine parameters for a special effect;
    b) overlaying object parameters for the special effect over original objects of a document;
    c) determining whether topmost objects have all opaque separations and carrying out at least one of:
        i) extracting and tagging runs with intent tags appropriate to the object type from the topmost object if it is determined whether the topmost object have opaque separations, or
        ii) creating runs extracting color information from top and bottom objects and attaching at least one programmable intent tag that can produce special effects;
    d) collecting runs; and
    e) rendering runs with intent tags.

11. The method of claim 10, wherein at least one of the Adobe Postscript setoverprint or Adobe Postscript setoverprintmode operators are used to carry out the methods.

12. A printing system adapted for achieving special effects on a rendered document, comprising a software module providing functions of at least one of Adobe Postscript setoverprint and setoverprintmode operations; object optimized rendering (OOR); and a color imager;
    wherein said software module is adapted to flatten object parameters for the special effect and original objects of a document by addressing the topmost objects first to produce runs with intent tags; and
    wherein separations from stacked objects are combined with control over at least one of OOR tags and color values to achieve special effects on a rendered document.

13. The system of claim 12 wherein the software module includes the use of an interpreter to determine parameters for a special effect.

14. The system of claim 12 wherein the software module is adapted to overlay object parameters for the special effect over original objects of a document.

15. The system of claim 12 wherein the software module is adapted to introduce intents for use with special effects.

16. The system of claim 12 wherein the software module is adapted to collate runs.

17. The system of claim 12 wherein the software module is adapted to render runs with intent tags.

18. The system of claim 12 wherein the software module is adapted to determine and execute parameters for a special effect including parameters selected from at least one of: MaskBox, MaskBitmap, MaskTrap and SetColor.

19. The system of claim 12 wherein the software module is adapted to:
    use of an interpreter to determine parameters for a special effect;
    overlay object parameters for the special effect over original objects of a document;
    flatten object parameters for the special effect and original objects of a document by addressing the topmost objects first to produce runs with intent tags;
    introduce intents for use with special effects;
    collect runs; and
    render runs with intent tags.

\* \* \* \* \*